(12) United States Patent
Yamada et al.

(10) Patent No.: US 12,352,336 B2
(45) Date of Patent: Jul. 8, 2025

(54) GEAR DEVICE AND ACTUATOR

(71) Applicant: Nabtesco Corporation, Tokyo (JP)

(72) Inventors: Eisuke Yamada, Tokyo (JP);
Katsuyuki Hatanaka, Tokyo (JP);
Kazuhiko Sakurai, Tokyo (JP); Koji Nakamura, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/967,846

(22) Filed: Dec. 4, 2024

(65) Prior Publication Data

US 2025/0189012 A1    Jun. 12, 2025

(30) Foreign Application Priority Data

Dec. 8, 2023  (JP) .................................. 2023-207827
Nov. 12, 2024  (JP) .................................. 2024-197451

(51) Int. Cl.
*F16H 1/32*    (2006.01)

(52) U.S. Cl.
CPC ......... *F16H 1/32* (2013.01); *F16H 2001/325* (2013.01)

(58) Field of Classification Search
CPC ............................. F16H 1/32; F16H 2001/325
USPC ........................................ 475/162, 163, 168
See application file for complete search history.

(56) References Cited

U.S. PATENT DOCUMENTS

| 4,898,065 A | * | 2/1990 | Ogata | ....................... F16H 1/32 |
| | | | | 475/179 |
| 8,858,383 B2 | * | 10/2014 | Nishioka | ................... F16H 1/32 |
| | | | | 475/170 |

FOREIGN PATENT DOCUMENTS

JP    2008-240852 A    10/2008

* cited by examiner

*Primary Examiner* — Derek D Knight
(74) *Attorney, Agent, or Firm* — Pillsbury Winthrop Shaw Pittman, LLP

(57) ABSTRACT

A gear device according to the disclosure includes an internal gear having a pin groove, a pin rotatably supported by the pin groove, an external gear oscillatorily rotating while its external tooth is engaging with the pin, and a speed reduction unit. The speed reduction unit decelerates a rotational driving force of an electric motor and transmits the decelerated rotational driving force to a rotating drive unit. The speed reducer includes a first reduction unit disposed on the input side and a second reduction unit disposed coaxially with the first reduction unit on the output side. A gap is formed between the external gear and the pin when the center of the pin groove, the center of the pin, and the tooth bottom of the external gear are aligned. The first gap in the first reduction unit is larger than the second gap in the second reduction unit.

10 Claims, 5 Drawing Sheets

GEAR DEVICE AND ACTUATOR

CROSS-REFERENCE TO RELATED APPLICATIONS

This application is based on and claims the benefit of priority from Japanese Patent Application Serial 2023-207827 (filed on Dec. 8, 2023) and 2024-197451 (filed on Nov. 12, 2024), the contents of which are hereby incorporated by reference in its entirety.

TECHNICAL FIELD

The present disclosure relates to a gear device and an actuator.

BACKGROUND

In conventional gear devices that are used with electric motors for electrically driving actuators by a battery, elastic deformation control holes are provided to level the elastic deformation in their radial direction. This leveling of the load on outer pins of an external gear reduces noise and vibration generated during operation.

As such an actuator, for example, as a pivot shaft to open and close heavy objects, a speed reducer with a high reduction ratio is used. As a speed reducer with a high reduction ratio, high precision speed reducers are provided in series with a motor on the same axis, specifically, a first reducer is provided on the front stage (motor side) and a second reducer on the rear stage (output side) to reduce the capacity of the motor relative to the output torque (see, for example, Japanese Patent Application Publication No. 2008-240852 ("the '852 Publication")).

The product efficiency (overall efficiency of the product) of the actuator disclosed in the '852 Publication is poor because speed reducers are used in two stages. In particular, if an input shaft loss of the second speed reducer on the output side and/or input torque variation of the are/is large, the loss and/or the variation is multiplied by the speed ratio of the second stage, which significantly affects the product efficiency and output torque variation. Therefore, it is desired to make an improvement in this respect.

The present disclosure provides a gear device and an actuator that can improve product efficiency and reduce unevenness of the output torque, and also maintain motor capacity.

SUMMARY

A gear device according to one aspect of the disclosure includes: an internal gear having a pin groove on its inner circumference; a pin rotatably supported by the pin groove; an external gear oscillatorily rotating while its external tooth is engaging with the pin; and a speed reduction unit for decelerating a rotational driving force of an electric motor from an input side to an output side and transmitting the decelerated rotational driving force to a rotating drive unit. The speed reduction unit includes a first reduction unit disposed on the input side and a second reduction unit disposed coaxially with the first reduction unit on the output side. A gap is formed between the external gear and the pin when the center of the pin groove, the center of the pin, and the tooth bottom of the external gear are aligned. The first gap formed in the first reduction unit is larger than the second gap formed in the second reduction unit.

With the above configuration, when the center of the pin groove, the center of the pin and the tooth bottom of the external gear are aligned in the first reduction unit, the first gap between the external gear and the pin in the first reduction unit is larger than the second gap in the second reduction unit. In this way, it is possible to reduce resistance caused by metal contact and unevenness in the output torque of the second reduction unit. Thus, the efficiency of the entire speed reducer can be improved while maintaining the motor capacity. Moreover, by reducing the diameter of the pin, it is possible to make the first gap larger than the second gap. Consequently, the electric motor can be made smaller.

It is preferable that the curvature radius of the pin groove be larger than the radius of the pin in the first reduction unit.

In the above gear device, a backlash between the internal gear and the external gear in the first reduction unit may be larger than a backlash between the internal gear and the external gear in the second reduction unit.

By this configuration, the backlash formed in the front reduction unit becomes larger than the backlash formed in the second reduction unit. In this way, it is possible to reduce resistance caused by metal contact and unevenness in the output torque of the second reduction unit. Thus, the efficiency of the entire speed reducer 1 can be improved while maintaining the motor capacity.

A case housing both the first reduction unit and the second reduction unit is provided. A space in the case is filled with lubricant when a rotation axis of the electric motor is horizontal, and the filling height of the lubricant is preferably situated above a center shaft of the first reduction unit and at a position where the first reduction unit is not fully filled with the lubricant.

In the above gear device, the gap is formed between the external gear and the pin when the center of the pin groove, the center of the pin, and the tooth bottom of the external gear are aligned, and the first gap formed in the first reduction unit is larger than the second gap formed in the second reduction unit. The curvature radius of the pin groove is larger than the radius of the pin in the first reduction unit. A case housing both the first reduction unit and the second reduction unit is provided. A space in the case is filled with lubricant when the rotation axis of the electric motor is horizontal, and the filling height of the lubricant is preferably situated above a center shaft of the first reduction unit and at a position where the first reduction unit is not fully filled with the lubricant.

With the above configuration, when the center of the pin groove, the center of the pin and the tooth bottom of the external gear are aligned in the first reduction unit, the first gap between the external gear and the pin in the first reduction unit becomes larger than the second gap in the second reduction unit. In this way, it is possible to reduce resistance caused by metal contact and unevenness in the output torque of the second reduction unit. Thus, the efficiency of the entire speed reducer 1 can be improved while maintaining the motor capacity. Moreover, by reducing the diameter of the pin, it is possible to make the first gap larger than the second gap. Consequently, the electric motor can be made smaller. Further, since the curvature radius of the pin groove is larger than the radius of the pin in the first reduction unit, the pins roll more easily, which allows more efficient suppression of resistance caused by metal contact and reduces unevenness in the output torque of the second reduction unit. When the rotation axis of the electric motor is horizontal, the filling height of the lubricant is situated above the center shaft (rotational center) of the first reduction unit and at the position where the first reduction unit is not fully filled with the lubricant. Therefore, the motor load can be reduced compared to the case where the space in the case is fully filled with the lubricant, and thereby it is possible to reduce unevenness in the torque of the first reduction unit, which is the input side.

In the above gear device, a case housing both the first reduction unit and the second reduction unit is provided. A space in the case is filled with lubricant when a rotation axis of the electric motor is horizontal, and the filling height of the lubricant is situated above the center shaft of the first reduction unit and at a position where the first reduction unit is not fully filled with the lubricant.

By this configuration, the backlash formed in the front reduction unit becomes larger than the backlash formed in the second reduction unit. In this way, it is possible to reduce resistance caused by metal contact and unevenness in the output torque of the second reduction unit. Thus, the efficiency of the entire speed reducer 1 can be improved while maintaining the motor capacity. When the rotation axis of the electric motor is horizontal, the filling height of the lubricant is situated above the center shaft (rotational center) of the first reduction unit and at the position where the first reduction unit is not fully filled with the lubricant. Therefore, the motor load can be reduced compared to the case where the space in the case is fully filled with the lubricant, and thereby it is possible to reduce unevenness in the torque of the first reduction unit, which is the input side.

A gear device according to another aspect of the disclosure includes: an internal gear; and an external gear oscillatorily rotating while its tooth is engaging with a tooth of the internal gear; and a speed reduction unit for decelerating a rotational driving force of an electric motor from an input side to an output side and transmitting the decelerated rotational driving force to a rotating drive unit. The speed reduction unit includes a first reduction unit disposed on an input side and a second reduction unit disposed coaxially with the first reduction unit on an output side. The first reduction unit further includes a carrier holding the external gear. A case housing both the first reduction unit and the second reduction unit is provided. The case has a partition wall separating a first space in which the first reduction unit is disposed from a second space in which the second reduction unit is disposed, the partition wall being penetrated via an oil seal by a shaft, which is an output shaft of the first reduction unit. The first space and the second space are filled with lubricant, and the inner diameter of the oil seal is smaller than the outer diameter of the carrier.

This configuration allows the internal space of the speed reducer to be separated into the first space and the second space by the partition wall of the case, which enables appropriate management of the filling amount of the lubricant in each of the first and second reduction unit. In other words, the lubricant in the space of each of the reduction units can be prevented from leaking out as in the case where the lubricant is filled in each space without depleting the lubricant. Regardless of the direction of the rotation axis J of the electric motor, the filling height of the lubricant in each of the first and second spaces will be at least situated at the position where each reduction unit (first reduction unit and second reduction unit) is filled with the lubricant. Therefore, the motor load can be reduced, and thereby it is possible to reduce unevenness in the torque of the first reduction unit, which is the input side. In this way, the speed reducer can be installed not only on a horizontal shaft with the rotation axis pointing horizontally, but also on a vertical shaft, so that the turning angle of the speed reducer is no longer limited. In addition, the structure is not limited to a structure in which the shaft rotates as in this embodiment. For example, the case may rotate, or even both the shaft and case may rotate, to expand the range of applications. Further, in the above gear device, the inner diameter of the oil seal is smaller than the outer diameter of the carrier, which reduces the contact area of the oil seal. Thus, the torque loss of the shaft caused by the oil seal can be reduced. In this way, the speed reducer can reduce unevenness in the output torque of the second reduction unit. Thus, the efficiency of the entire speed reducer 1 can be improved while maintaining the motor capacity.

Yet another aspect of the disclosure provides an actuator. The actuator includes an electric motor, and the above gear device. The gear device includes a two-stage speed reduction unit as the reduction unit. The two-stage speed reduction unit includes the first reduction unit disposed on the input side and the second reduction unit disposed coaxially with the first reduction unit on the output side. The gap is formed between the external gear and the pin when the center of the pin groove, the center of the pin, and the tooth bottom of the external gear are aligned. The first gap formed in the first reduction unit is larger than the second gap formed in the second reduction unit.

With the above configuration, when the center of the pin groove, the center of the pin, and the tooth bottom of the external gear are aligned in the first reduction unit, the first gap between the external gear and the pin in the first reduction unit can be made larger than the second gap formed in the second reduction unit. In this way, it is possible to reduce resistance caused by metal contact and unevenness in the output torque of the second reduction unit. Thus, the efficiency of the entire speed reducer 1 can be improved while maintaining the motor capacity. Moreover, by reducing the diameter of the pin, it is possible to make the first gap larger than the second gap. Consequently, the electric motor can be made smaller.

In the above actuator, it is preferable that a backlash between the internal gear and the external gear in the first reduction unit be larger than a backlash between the internal gear and the external gear in the second reduction unit.

By this configuration, the backlash formed in the front reduction unit becomes larger than the backlash formed in the second reduction unit. In this way, it is possible to reduce resistance caused by metal contact and unevenness in the output torque of the second reduction unit. Thus, the efficiency of the entire speed reducer 1 can be improved while maintaining the motor capacity.

Yet another aspect of the disclosure provides an actuator that includes an electric motor, and the above gear device. The gear device includes a two-stage speed reduction unit as the reduction unit. The two-stage speed reduction unit includes the first reduction unit disposed on the input side and the second reduction unit disposed coaxially with the first reduction unit on the output side. The first reduction unit further includes the carrier holding the external gear. The case that houses both the first reduction unit and the second reduction unit is provided. The case has the partition wall separating the first space in which the first reduction unit is disposed from the second space in which the second reduction unit is disposed. The partition wall being penetrated via the oil seal by the shaft, which is the output shaft of the first reduction unit. The first space and the second space are filled with the lubricant, and the inner diameter of the oil seal is smaller than the outer diameter of the carrier.

This configuration allows the internal space of the speed reducer to be separated into the first space and the second space by the partition wall of the case, which enables appropriate management of the filling amount of the lubricant in each of the first and second reduction unit. In other words, the lubricant in the space of each of the reduction units can be prevented from leaking out as in the case where the lubricant is filled in each space without depleting the lubricant. Regardless of the direction of the rotation axis J of the electric motor, the filling height of the lubricant in each of the first and second spaces will be at least situated at the position where each reduction unit (first reduction unit and second reduction unit) is filled with the lubricant. Therefore, the motor load can be reduced, and thereby it is possible to reduce unevenness in the torque of the first reduction unit, which is the input side. In this way, the speed reducer can be installed not only on a horizontal shaft with the rotation axis pointing horizontally, but also on a vertical shaft, so that the turning angle of the speed reducer is no longer limited. In addition, the structure is not limited to a structure in which the shaft rotates as in this embodiment. For example, the case may rotate, or even both the shaft and case may rotate, to expand the range of applications. Further, in the above gear device, the inner diameter of the oil seal is smaller than the outer diameter of the carrier, which reduces the contact area of the oil seal. Thus, the torque loss of the shaft caused by the oil seal can be reduced. In this way, the speed reducer can reduce unevenness in the output torque of the second reduction unit. Thus, the efficiency of the entire speed reducer 1 can be improved while maintaining the motor capacity.

Advantageous Effects

The above gear device and actuator can improve product efficiency and reduce unevenness in the output torque, and also maintain the motor capacity.

DESCRIPTION OF THE EMBODIMENTS

The embodiments of the present disclosure will be hereinafter described with reference to the drawings. In the following embodiments and modifications, like elements will be denoted by the same reference signs and redundant descriptions will be partly omitted.

First Embodiment

Figure 1:
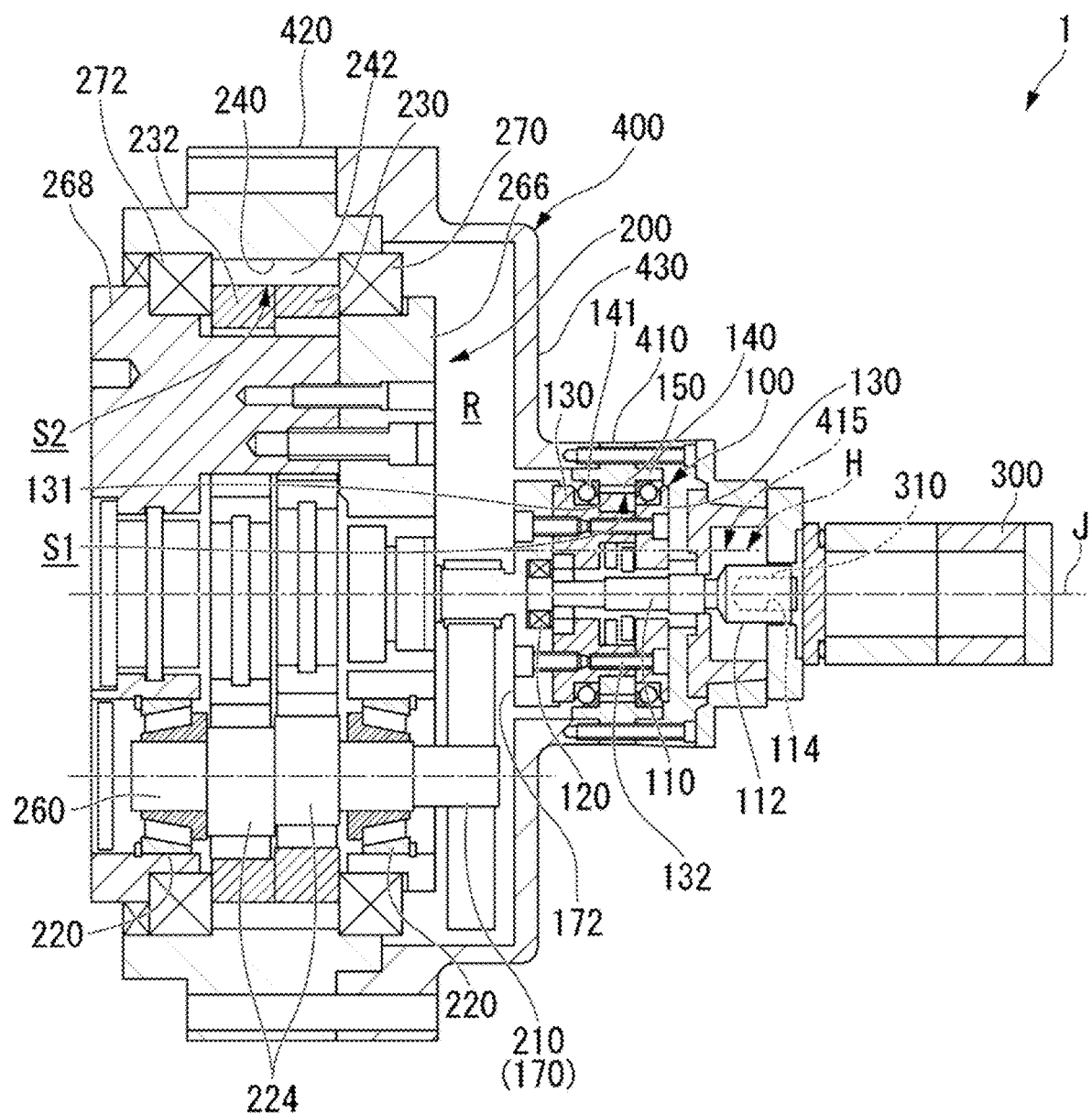
FIG. 1 is a sectional view of essential parts of a speed reducer of a first embodiment.
Figure 2:
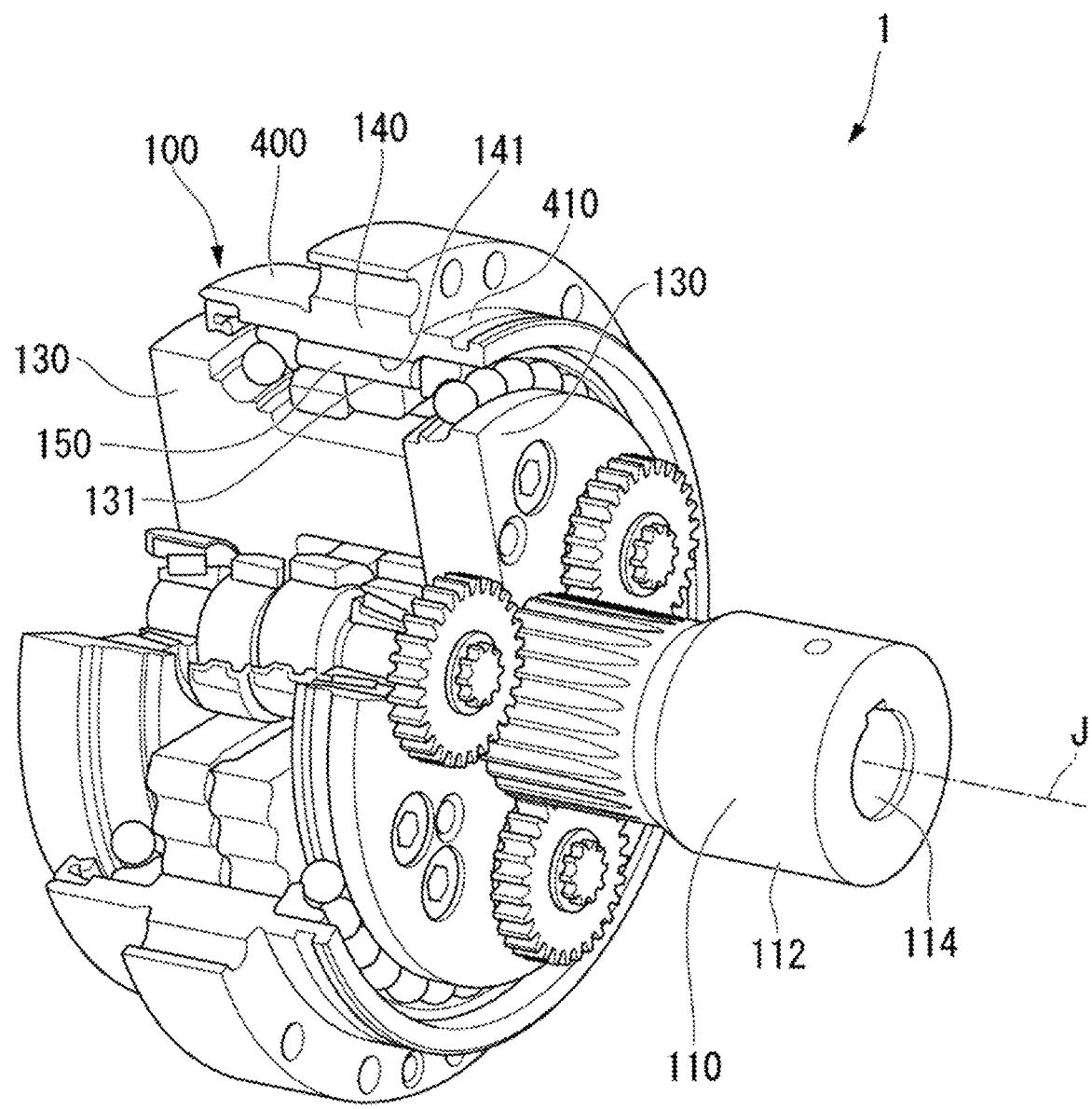
FIG. 2 is a perspective view of main parts of a front reduction unit shown in FIG. 1.
Figure 3:
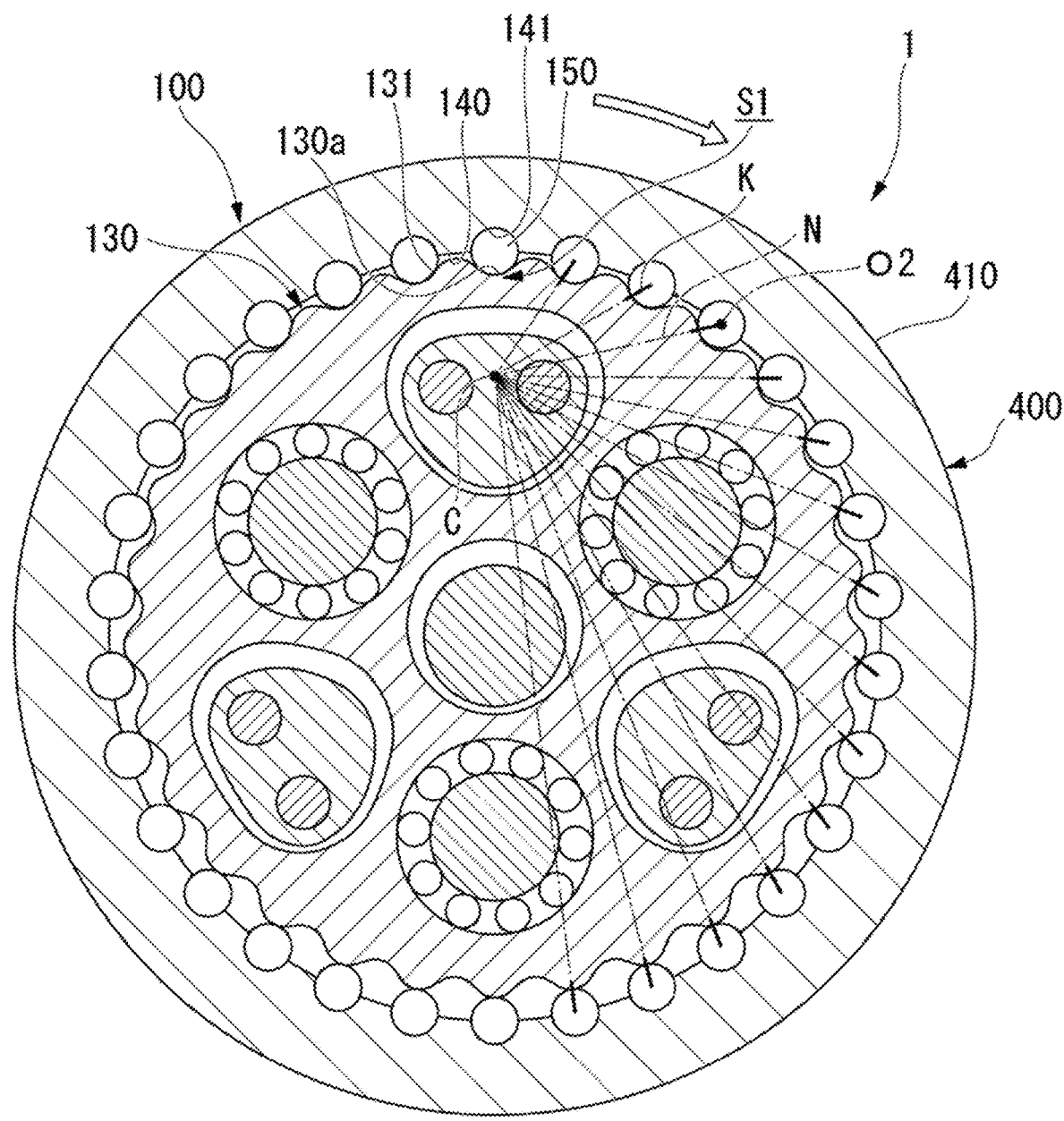
FIG. 3 is a plan view of the front reducer of FIG. 1, viewed from the direction of a rotation axis.
Figure 4:
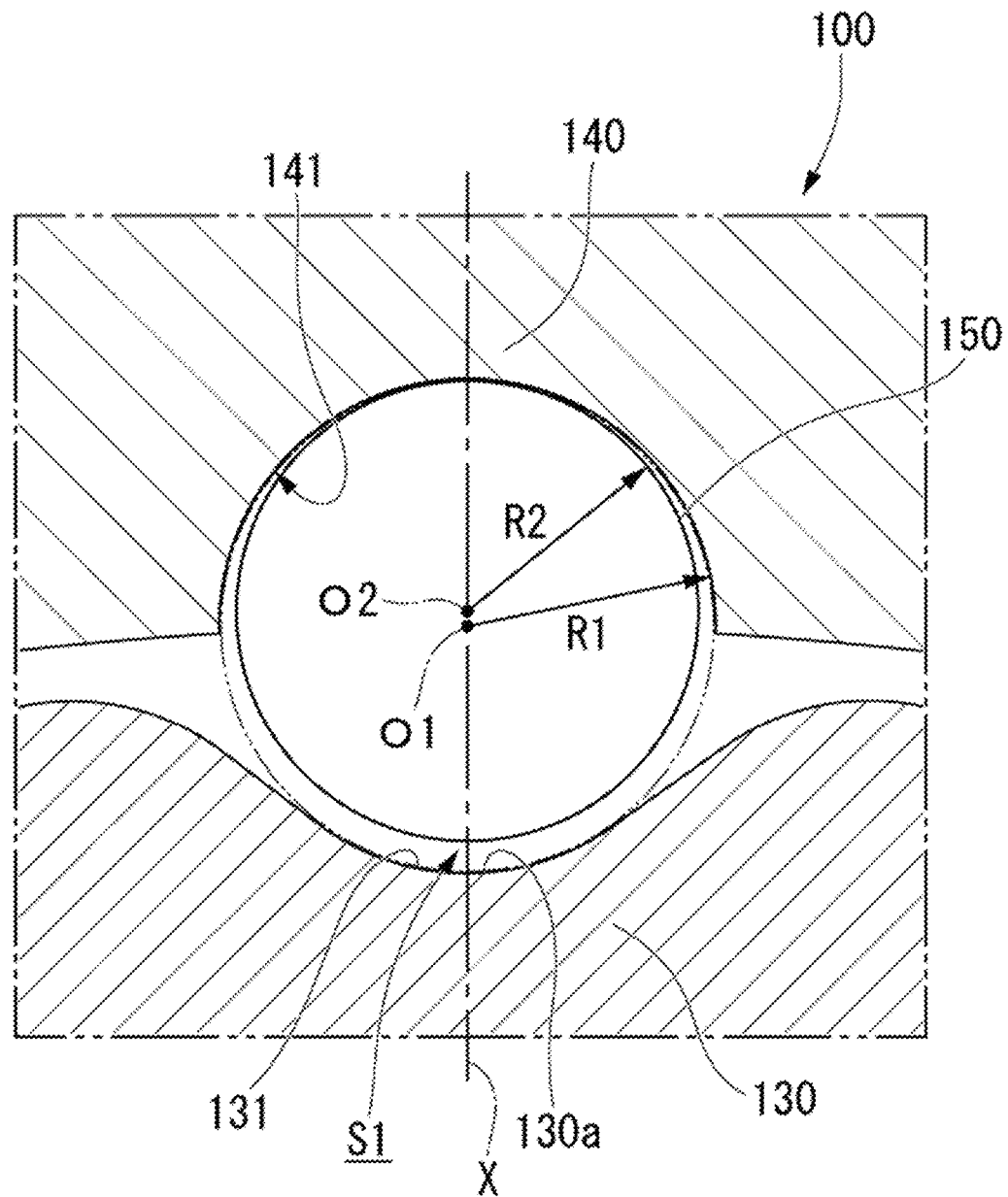
FIG. 4 is a sectional view showing a main part of a pin shown in FIG. 3.

FIG. 1 is a sectional view of essential parts of a speed reducer 1 according to an exemplary embodiment. FIG. 2 is a perspective view of main parts of a first reduction unit 100 shown in FIG. 1. FIG. 3 is a plan view of the first reduction unit 100, viewed from the direction of a rotation axis. FIG. 4 is a sectional view showing a main part of a pin 150 shown in FIG. 3.

The speed reducer 1 (gear device) is connected to an electric motor 300 and used as part of a so-called geared motor. The speed reducer 1 is coupled to an actuator having the electric motor 300, for example, a robot arm or hand, which is not shown in the drawings.

The speed reducer 1 includes a two-stage speed reduction unit for decelerating a rotational driving force of the electric motor 300 from the input side to the output side and transmitting the decelerated rotational driving force to a rotating drive unit. In other words, the speed reducer 1 includes a first reduction unit 100 and a second reduction unit 200. The first reduction unit 100 is disposed on the input side and has an internal meshing planetary gear structure. The second reduction unit 200 is disposed coaxially with the first reduction unit 100 on the output side, and has an internal meshing planetary gear structure that receives the output of the first reduction unit 100.

The first reduction unit 100 and the second reduction unit 200 will now be described in detail in the stated order. As shown in FIGS. 1 and 2, the first reduction unit 100 and the second reduction unit 200 are housed in a same case 400. The case 400 includes a first case portion 410, a second case portion 420, and a connecting portion 430. The first case portion 410 has a cylindrical shape that covers the first reduction unit 100 in the circumferential direction. The second case portion 420 has a larger diameter than the first case portion 410 and has a cylindrical shape that covers the second reduction unit 200 in the circumferential direction. The connecting portion 430 connects a rear end of the first case portion 410 and a front end of the second case portion 420. The first case portion 410, the second case portion 420, and the connecting portion 430 are provided as a single unit. The first reduction unit 100 is housed in the first case portion 410. The second reduction unit 200 is housed in the second case portion 420.

As shown in FIG. 1, in the speed reducer 1, a space R in the case 400 is filled with lubricant 415 when a rotation axis J of the electric motor 300 is horizontal. The reference numeral H in FIG. 1 indicates the filling height of the lubricant 415 filled therein. That is, the filling height H of the lubricant 415 is situated above a center shaft (rotation axis line J) of the first reduction unit 100 and at a position where the first reduction unit 100 is not fully filled with the lubricant 415. This filling height H of the lubricant 415 is about 60% of the capacity of the space R in the case 400, for example.

A connecting portion 112 extends from one end of an input shaft 110 of the first reduction unit 100. An insertion hole 114 is formed in the connecting portion 112. A motor shaft 310 of the electric motor 300 is inserted and received in the insertion hole 114.

The input shaft 110 is supported by the first case portion 410 and a carrier 172 of a first output shaft 170 (=second input shaft 210) described below via a pair of bearings 120. An eccentric member, not shown, is incorporated between the pair of bearings 120. Two external gears 130 are pivotally and rotatably disposed on the periphery of the eccentric member via roller bearings. The external gears 130 are internally meshed with an internal gear 140 formed integrally with the first case portion 410. The internal teeth of the internal gear 140 are formed by cylindrical pins 150 supported in a rotatable manner.

The two external gears 130 each have internal pin holes formed through which internal pins 132 are inserted. The internal pins 132 are capable of extracting the relative rotational component between the external gears 130 and the internal gear 140. The internal pins 132 are fixed to the carrier 172, which is integrally formed with the first output shaft 170, and are supported in a cantilever manner by the carrier 172.

The first output shaft 170 extends and also serves as the second input shaft 210 of the second reduction unit 200.

The internal gear 140, which is disposed on the inner circumference of the first case portion 140 and at the substantially center in the axial direction, has a plurality of pin grooves 141 each of which has a semi-circular shape in cross section. These pin grooves 141 extend in the axial direction and are spaced equidistant apart in the circumferential direction, here by a constant pitch.

As shown in FIG. 3, almost half of the number of cylindrical pins 150 (the number of pins 150 equals to the number of pin grooves 141) are fitted in the pin grooves 141 and supported rotatably. In this way, the pins 150 are disposed on the inner circumference of the first case portion 410 at equal intervals (at a constant pitch) in the circumferential direction. Here, the constant pitch is defined as a value obtained by dividing the circumferential length of a virtual center circle passing through the centers of all the pins 150 by the number of pins 150. In other words, the constant pitch is the arc length of an arc line segment connecting between the centers of any two adjacent pins 150.

As shown in FIG. 1, two or more ring-shaped external gears 130 (two in this case) are housed and arranged in the axial direction inside the internal gear 140. On the outer periphery of these external gears 130, formed are a number of external teeth 131 each having a trochoidal tooth profile, or more specifically, peritrochoidal tooth profile. The external gears 130 oscillatorily rotate while the external teeth 131 engages with the pins 150.

The number of the external teeth 131 on the external gear 130 is one less than the number of the pins 150 (the tooth number difference is 1). The reason why the difference in the number of teeth between the pins 150 and the external gear 131 is set to one is that a higher reduction ratio can be achieved and the machining cost can be reduced compared to when the difference in the number of teeth between these two is 2 or more.

As shown in FIG. 1, the first reduction unit 100 has an end plate-shaped carrier 172. The pair of external gears 130 are rotatably held in the carrier 172 by inner pins 132. The electric motor 300 is operated to cause the external gears 130 to rotate in an eccentric oscillating manner. At this time, as shown in FIG. 3, at the contact points of the external teeth 131 and pins 150 meshing with each other, a drive component force in the direction of the line of action N is applied respectively from the external teeth 131 to the corresponding pins 150, and a reaction force K of the drive component force in the direction of the line of the action N is applied from the pins 150 to the external teeth 131 as a reaction.

As shown in FIGS. 3 and 4, in the first reduction unit 100, a gap S1 is formed between the external gear 130 and the pins 150 when a center O1 of the pin groove 141, a center O2 of the pin 150, and a tooth bottom 130a of the external gear 130 are aligned. The reference numeral X in FIG. 4 indicates a straight line connecting the center O1 of the pin groove 141, the center O2 of the pin 150, and the tooth bottom 130a of the external gear 130. The first gap S1 formed in the first reduction unit 100 is set to be larger than a second gap S2 formed in the second reduction unit 200 (see FIG. 1). For example, this can be achieved by making the outer diameter of the pin 150 smaller than the outer diameter that is set to make no (zero) gap S1 as described above. This gap S1 varies depending on the speed reducer 1 employed and the diameter dimension of the pin.

As shown in FIG. 4, the curvature radius R1 of the pin groove 141 is set larger than the radius R2 of the pin 150 in the first reduction unit 100. In other words, when the pin 150 is engaged with the pin groove 141, the center O2 of the pin 150 is located on the outer circumference side rather than the center O1 of the pin groove 141.

Referring to FIG. 3, the reference numeral K indicates the reaction force applied to the outer tooth 131, and the reference numeral N indicates the line of action. The line of action N of each reaction force K extends perpendicularly to the tooth surface at the point of contact between the external gear 131 and the pin 150. These multiple lines of action N meet (intersect) at one point on the external gear 130, that is, at the meeting point C, because the pins 150 have a cylindrical shape and the external teeth 131 have a trochoid tooth profile, as mentioned above. The sum of the tangential components of the drive component forces is then given to the internal gear 140 as the rotational driving force.

As shown in FIG. 1, the second input shaft 210 is supported by a first output flange 266 and second output flange 268 described below via a pair of tapered roller bearings 220. Eccentric members 224 are provided between the pair of tapered roller bearings 220 and 220. Two external gears 230, 232 are provided on the periphery of the eccentric members 224 via the roller bearings. The external gears 230, 232 are internally meshed with an internal gear 240 that is integrated with the second case portion 420. The internal teeth of the internal gear 240 are formed of cylindrical outer pins 242 that are rotatably supported.

A high-precision eccentric inner pin 260 is inserted into the two external gears 230 and 232. The eccentric inner pin 260 is supported by a pair of disc-shaped first and second output flanges 266 and 268, situated on the outer sides of the external gears 230 and 232, respectively, via bearings 270 and 272. The first output flange 266 and the second output flange 268 are rotatably supported by the second case portion 420 via the bearings 270 and 272, respectively.

In the speed reducer 1 of this embodiment, for backlashes between the internal and external gears, a backlash in the first reduction unit 100 (first backlash) is larger than a backlash in the second reduction unit 200 (second backlash).

As described above, the speed reducer 1 includes the internal gear 140 having the pin grooves 141 on its inner circumference, the pins 150 rotatably supported in the pin grooves 141, and the external gear 130 that oscillatorily rotates while the external teeth 131 mesh with the pins 150. The speed reducer 1 includes the two-stage speed reduction unit for decelerating a rotational driving force of the electric motor 300 from the input side to the output side and transmitting the decelerated rotational driving force to the rotating drive unit. The two-stage speed reduction unit has the first reduction unit 100 disposed on the input side and the second reduction unit 200 disposed coaxially with the first reduction unit 100 on the output side. The gap S1 is formed between the external gear 130 and the pin 150 when the center O1 of the pin groove 141, the center O2 of the pin 150, and the tooth bottom 130a of the external gear 130 are aligned. The first gap S1 formed in the first reduction unit 100 is larger than the second gap S2 formed in the second reduction unit 200.

This configuration makes the first gap S1 between the external gear 130 and the pin 150 larger than the second gap S2 in the second reduction unit 200 when the center O1 of the pin groove 141, the center O2 of the pin 150, and the tooth bottom 130a of the external gear 130 are aligned in the first reduction unit 100. In this way, it is possible to reduce resistance caused by metal contact and unevenness in the output torque of the second reduction unit 200. Thus, the efficiency of the entire speed reducer 1 can be improved while maintaining the motor capacity. As described above, in the embodiment, by reducing the diameter of the pin 150, it is possible to make the first gap S1 larger than the second gap S2. Consequently, the electric motor 300 can be made smaller.

In the speed reducer 1, the curvature radius R1 of the pin groove 141 is larger than the radius R2 of the pin 150 in the first reduction unit 100. In this way, the pins 150 roll more easily, which allows more efficient suppression of resistance caused by metal contact and reduces unevenness in the output torque of the second reduction unit 200.

Furthermore, in the speed reducer 1, the case 400 is provided that houses both the first reduction unit 100 and the second reduction unit 200. When the rotation axis of the electric motor 300 is horizontal, the space R in the case 400 is filled with the lubricant 415. The filling height H of the lubricant 415 is above the center shaft (rotation axis J) of the first reduction unit 100 and at the position where the first reduction unit 100 is not fully filled with the lubricant 415. Thus, the first reduction unit 100 is not fully filled with the lubricant 415. Therefore, the motor load can be reduced compared to the case where the space R in the case 400 is fully filled with the lubricant 415, and thereby it is possible to reduce unevenness in the torque of the first reduction unit 100, which is the input side.

Second Embodiment

Figure 5:
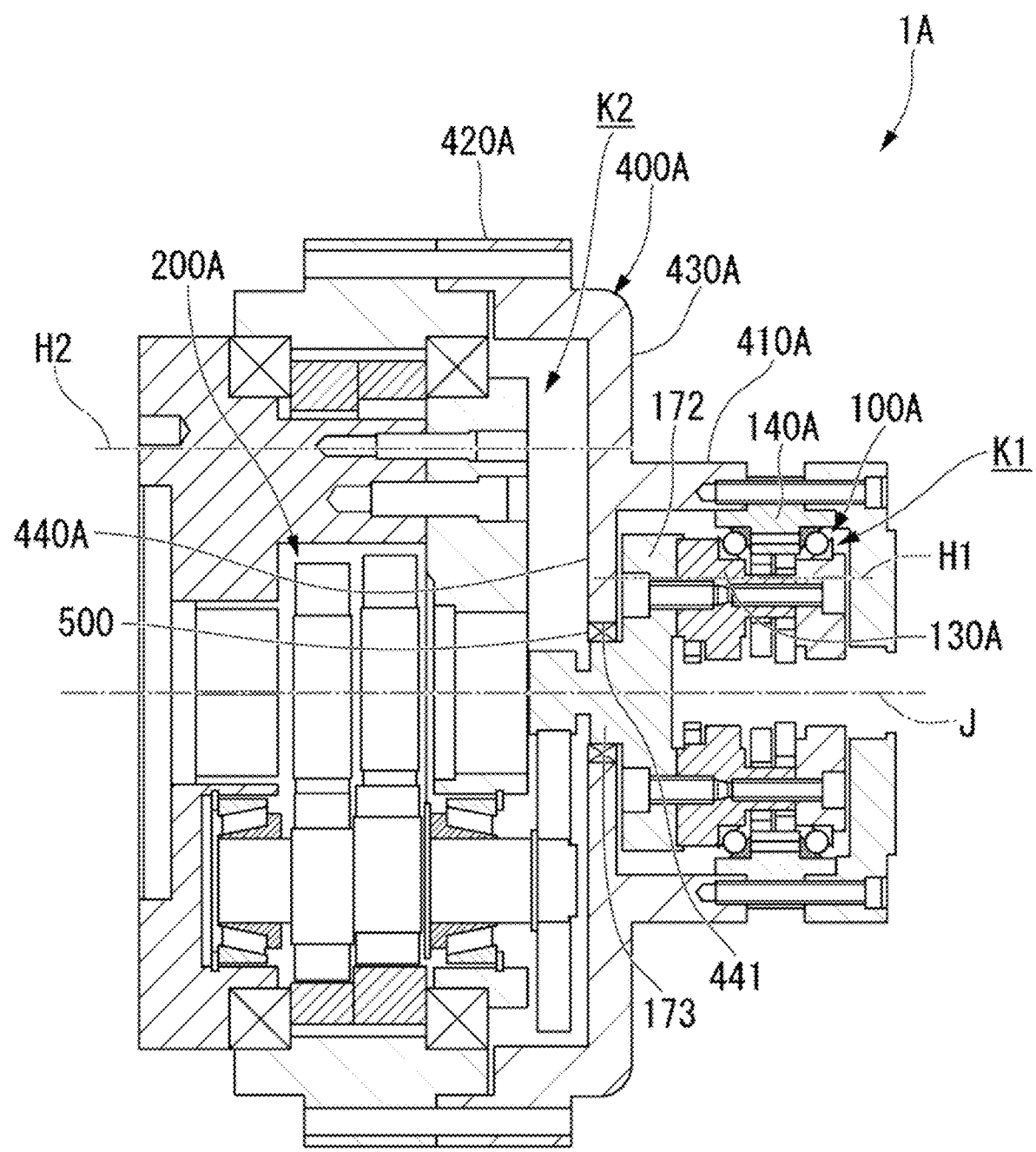
FIG. 5 is a sectional view of essential parts of a speed reducer of a second embodiment.

As shown in FIG. 5, a speed reducer 1A (gear device) of the second embodiment includes a two-stage speed reduction unit for decelerating a rotational driving force of the electric motor (not shown, see FIG. 1) in the direction from the input side to the output side and transmitting the decelerated rotational driving force to the rotating drive unit. The two-stage speed reduction unit has a first reduction unit 100A disposed on the input side and a second reduction unit 200A disposed coaxially with the first reduction unit 100A on the output side. The electric motor can be omitted in this embodiment.

The first reduction unit 100A includes the internal gear 140 and the external gear 130 that oscillatorily rotates while the teeth of the internal gear 140 engage therewith. The first reduction unit 100A further includes a carrier 172 that holds the external gear 130. The carrier 172 has a shaft 173 that is coaxial with the rotation axis J on the axial output side. The shaft 173 corresponds to the output shaft of the first reduction unit 100A. The shaft 173 protrudes from a front surface 172a of the carrier 172 toward the output side. The shaft 173 is integrally provided with the carrier 172 here. Alternatively, the shaft 173 may be separately provided.

In the speed reducer 1A, a case 400A is provided that houses both the first reduction unit 100A and the second reduction unit 200A. The case 400A includes a first case portion 410A, a second case portion 420A, and a connecting portion 430A. The first case portion 410A has a cylindrical shape that covers the first reduction unit 100A in the circumferential direction. The second case portion 420A has a larger diameter than the first case portion 410A and has a cylindrical shape that covers the second reduction unit 200A in the circumferential direction. The connecting portion 430A connects a rear end of the first case portion 410A and a front end of the second case portion 420A.

The case 400A is provided with a partition wall 440A. The shaft 173, which is the output shaft of the first reduction unit 100A penetrates the partition wall 440A via an oil seal 500. The partition wall 440A separates a first space K1 in which the first reduction unit 100A is disposed from a second space K2 in which the second reduction unit 200A is disposed. These first case portion 410A, second case portion 420A, connecting portion 430A, and partition wall 440A are provided integrally. The partition wall 440A may be divided with respect to the other parts of the case 400A (first case portion 410A, second case portion 420A, and connecting portion 430A). The first reduction unit 100A is housed in the first case portion 410A. The second reduction unit 200A is housed in the second case portion 420A.

The partition wall 440A has, in its central portion, the through hole 441 formed coaxially with the rotation axis J. The shaft 173 is inserted in the through hole 441. The oil seal 500 is disposed between the through hole 441 and the shaft 173. The inner diameter of the oil seal 500 is smaller than the outer diameter of the carrier 172.

The first space K1 and the second space K2 are filled with the lubricant 415. The first space K1 and the second space K2 each may be filled with an appropriate amount of the lubricant 415. The appropriate amount may be for example, 60% to 80% of the space K1 and the second space K2, respectively. In this way, the orientation of the speed reducer 1A can be set as desired because each space K1 and K2 are compartmentalized and independent of each other, and the filling height of the lubricant 415 therein is constant. In FIG. 5, the reference numeral H1 indicates the filling level (filling height) of the lubricant 415 in the first space K1, and the reference numeral H2 indicates the filling level (filling height) of the lubricant 415 in the second space K2.

In the speed reducer 1A of the second embodiment, the case 400A is provided with the partition wall 440A. The shaft 173, which is the output shaft of the first reduction unit 100A penetrates the partition wall 440A via an oil seal 500. The partition wall 440A separates a first space K1 in which the first reduction unit 100A is disposed from a second space K2 in which the second reduction unit 200A is disposed. The first space K1 and the second space K2 are filled with the lubricant 415. The inner diameter of the oil seal 500 is smaller than the outer diameter of the carrier 172.

In this manner, the internal space of the speed reducer 1A can be divided into the first space K1 and second space K2 by the partition wall 440A of the case 400A. Thus, the filling amount of the lubricant 415 in each of the first reduction unit 100A and the second reduction unit 200A can be properly controlled. In other words, the lubricant 415 in each space K1 and K2 of the reduction units 100A and 200A can be prevented from leaking out as in the case where the lubricant 415 is filled 100% in each space K1 and K2 without depleting the lubricant 415. Regardless of the direction of the rotation axis J of the electric motor, the filling height of the lubricant 415 in each of the first and second spaces K1 and K2 will be at least situated at the position where each reduction unit (first reduction unit 100A and second reduction unit 200A) is filled with the lubricant. Therefore, the motor load can be reduced, and thereby it is possible to reduce unevenness in the torque of the first reduction unit 100A, which is the input side.

In this way, the speed reducer 1A of this embodiment can be installed not only on a horizontal shaft with the rotation axis J pointing horizontally, but also on a vertical shaft, so that the turning angle of the speed reducer 1A is no longer limited. In addition, the structure is not limited to a structure in which the shaft 173 rotates as in this embodiment. For example, the case 400A may rotate, or even both the shaft and case may rotate, to expand the range of applications.

In addition, the inner diameter of the oil seal 500 is smaller than the outer diameter of the carrier 172, which reduces the contact area of the oil seal 500. Therefore, the torque loss of the shaft (shaft 173) caused by the oil seal 500 can be reduced.

In this way, the speed reducer 1A of this embodiment can reduce unevenness in the output torque of the second reduction unit 200A. Thus, the efficiency of the entire speed reducer 1 can be improved while maintaining the motor capacity.

The present disclosure is not limited to the above-described embodiments, and the embodiments can be modified in a variety of designs without deviating from the spirit of the present disclosure. For example, in the above embodiment, the curvature radius R1 of the pin groove 141 is larger than the radius R2 of the pin 150 in the first reduction unit 100, but the configuration is not limited to this.

In the embodiment, the case 400 is provided that houses both the first reduction unit 100 and the second reduction unit 200. When the rotation axis of the electric motor 300 is horizontal, the space in the case 400 is filled with the lubricant 415. The filling height H of the lubricant 415 is above the center shaft (rotation axis J) of the first reduction unit 100 and at the position where the first reduction unit 100 is not fully filled with the lubricant 415. However, the disclosure is not limited to such a filling height H.

In the above embodiment, the gap is formed between the external gear and the pin when the center of the pin groove, the center of the pin, and the tooth bottom of the external gear are aligned. The first gap in the first reduction unit is larger than the second gap in the second reduction unit. However, the disclosure is not limited to such configuration. The gap may be formed between the external gear and the pin when the center of the pin and the tooth bottom of the external gear 130 are aligned. For the tooth tips of the external gear, the tooth profile may be modified to provide gaps between the gear teeth and the pins.

The speed reducer 1 of the embodiments are formed of the planetary gear mechanism as an example, but the speed reducer 1 is not necessarily formed of the planetary gear mechanism.

What is claimed is:

1. A gear device, comprising:
   an internal gear having a pin groove on its inner circumference;
   a pin rotatably supported by the pin groove;
   an external gear oscillatorily rotating while its external tooth is engaging with the pin; and
   a speed reduction unit for decelerating a rotational driving force of an electric motor from an input side to an output side and transmitting the decelerated rotational driving force to a rotating drive unit,
   wherein the speed reduction unit includes:
      a first reduction unit disposed on the input side; and
      a second reduction unit disposed coaxially with the first reduction unit on the output side,
   wherein a gap is formed between the external gear and the pin when a center of the pin groove, a center of the pin, and a tooth bottom of the external gear are aligned, and
   wherein a first gap formed in the first reduction unit is larger than a second gap formed in the second reduction unit.

2. The gear device of claim 1, wherein a curvature radius of the pin groove is larger than a radius of the pin in the first reduction unit.

3. The gear device of claim 1, wherein a backlash between the internal gear and the external gear in the first reduction unit is larger than a backlash between the internal gear and the external gear in the second reduction unit.

4. The gear device of claim 1, wherein a case housing both the first reduction unit and the second reduction unit,
   wherein a space in the case is filled with lubricant when a rotation axis of the electric motor is horizontal, and
   wherein a filling height of the lubricant is situated above a center shaft of the first reduction unit and at a position where the first reduction unit is not fully filled with the lubricant.

5. The gear device of claim 1, wherein the gap is formed between the external gear and the pin when the center of the pin groove, the center of the pin, and the tooth bottom of the external gear are aligned, and
   wherein the first gap formed in the first reduction unit is larger than the second gap formed in the second reduction unit,
   wherein a curvature radius of the pin groove is larger than a radius of the pin in the first reduction unit,
   wherein a case housing both the first reduction unit and the second reduction unit is provided,
   wherein a space in the case is filled with lubricant when a rotation axis of the electric motor is horizontal, and
   wherein a filling height of the lubricant is situated above a center shaft of the first reduction unit and at a position where the first reduction unit is not fully filled with the lubricant.

6. The gear device of claim 3, wherein a case housing both the first reduction unit and the second reduction unit is provided,
   wherein a space in the case is filled with lubricant when a rotation axis of the electric motor is horizontal, and
   wherein a filling height of the lubricant is situated above a center shaft of the first reduction unit and at a position where the first reduction unit is not fully filled with the lubricant.

7. A gear device, comprising:
   an internal gear; and an external gear oscillatorily rotating while a tooth of the external gear is engaging with a tooth of the internal gear; and a speed reduction unit for decelerating a rotational driving force of an electric motor from an input side to an output side and transmitting the decelerated rotational driving force to a rotating drive unit comprising:
   wherein the speed reduction unit includes:
   a first reduction unit disposed on the input side; and
   a second reduction unit disposed coaxially with the first reduction unit on the output side,
   wherein the first reduction unit further includes a carrier holding the external gear,
   a case housing both the first reduction unit and the second reduction unit is provided,
   wherein the case has a partition wall separating a first space in which the first reduction unit is disposed from a second space in which the second reduction unit is disposed, the partition wall being penetrated via an oil seal by a shaft, which is an output shaft of the first reduction unit,
   wherein the first space and the second space are filled with lubricant, and
   wherein an inner diameter of the oil seal is smaller than an outer diameter of the carrier.

8. An actuator comprising:
   an electric motor; and
   the gear device of claim 1,
   wherein the gear device includes a two-stage speed reduction unit as the reduction unit, wherein the two-stage speed reduction unit includes the first reduction unit disposed on the input side and the second reduction unit disposed coaxially with the first reduction unit on the output side, wherein the gap is formed between the external gear and the pin when the center of the pin groove, the center of the pin, and the tooth bottom of the external gear are aligned, and wherein the first gap formed in the first reduction unit is larger than the second gap formed in the second reduction unit.

9. The actuator of claim 8, wherein a backlash between the internal gear and the external gear in the first reduction unit is larger than a backlash between the internal gear and the external gear in the second reduction unit.

10. An actuator, comprising:
an electric motor; and
the gear device of claim 7,
wherein the gear device includes a two-stage speed reduction unit as the reduction unit,
wherein the two-stage speed reduction unit includes the first reduction unit disposed on the input side and the second reduction unit disposed coaxially with the first reduction unit on the output side,
wherein the first reduction unit further includes the carrier holding the external gear,
wherein the case housing both the first reduction unit and the second reduction unit is provided,
wherein the case has the partition wall separating the first space in which the first reduction unit is disposed from the second space in which the second reduction unit is disposed, the partition wall being penetrated via the oil seal by the shaft, which is the output shaft of the first reduction unit,
wherein the first space and the second space are filled with the lubricant, and
wherein the inner diameter of the oil seal is smaller than the outer diameter of the carrier.

* * * * *